(12) United States Patent
Flanagan

(10) Patent No.: US 11,985,369 B2
(45) Date of Patent: *May 14, 2024

(54) METHODS AND SYSTEMS FOR MANAGING CONTENT RESTRICTIONS

(71) Applicant: Comcast Cable Communications, LLC, Philadelphia, PA (US)

(72) Inventor: Kevin Flanagan, Lakewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,868

(22) Filed: Apr. 13, 2023

(65) Prior Publication Data

US 2023/0319331 A1  Oct. 5, 2023

Related U.S. Application Data

(63) Continuation of application No. 15/877,004, filed on Jan. 22, 2018, now Pat. No. 11,659,218.

(51) Int. Cl.
| | |
|---|---|
| H04N 21/258 | (2011.01) |
| G06F 21/12 | (2013.01) |
| H04N 21/454 | (2011.01) |
| H04N 21/4627 | (2011.01) |
| H04N 21/61 | (2011.01) |
| H04N 21/647 | (2011.01) |

(52) U.S. Cl.
CPC ..... *H04N 21/25816* (2013.01); *G06F 21/121* (2013.01); *H04N 21/454* (2013.01); *H04N 21/4627* (2013.01); *H04N 21/6125* (2013.01); *H04N 21/64723* (2013.01)

(58) Field of Classification Search
None
See application file for complete search history.

(56) References Cited

U.S. PATENT DOCUMENTS

| | | |
|---|---|---|
| 6,637,029 B1 | 10/2003 | Maissel et al. |
| 8,561,102 B1 | 10/2013 | Mack et al. |
| 9,538,259 B1 | 1/2017 | Lam et al. |
| 2011/0055866 A1 | 3/2011 | Piepenbrink et al. |

(Continued)

FOREIGN PATENT DOCUMENTS

| | | |
|---|---|---|
| EP | 2954686 A1 | 12/2015 |
| WO | 2014/150086 A1 | 9/2014 |

OTHER PUBLICATIONS

Multichannel News, "fuboTV Rolls Out TV Blackout Standard," http://www.multichannel.com/news/content/fubotv-rolls-out-tv-blackout-standard/411448, Mar. 10, 2017.

*Primary Examiner* — James R Marandi
(74) *Attorney, Agent, or Firm* — BakerHostetler

(57) ABSTRACT

Methods and systems are described for managing blackout restrictions. A user device may retrieve a blackout condition from a blackout device. The blackout device may be a node in plurality of blackout nodes. Each of the blackout nodes may store blackout conditions for different corresponding content. The user device may retrieve the blackout condition from a blackout device associated with content in response to a request for the content. The user device may determine whether information associated with the user device satisfies the blackout condition. If the information satisfies the blackout condition, the requested content may be blocked. Alternative content may be output instead of the requested content.

21 Claims, 6 Drawing Sheets

(56) References Cited

U.S. PATENT DOCUMENTS

| | | |
|---|---|---|
| 2012/0174150 A1 | 7/2012 | Reddy et al. |
| 2014/0245341 A1 | 8/2014 | Mack et al. |
| 2014/0333713 A1 | 11/2014 | Shoemake et al. |
| 2016/0234307 A1 | 8/2016 | Yan et al. |
| 2016/0373794 A1 | 12/2016 | Heitlinger et al. |

METHODS AND SYSTEMS FOR MANAGING CONTENT RESTRICTIONS

CROSS-REFERENCE TO RELATED APPLICATIONS

This application is a continuation of U.S. patent application Ser. No. 15/877,004, filed Jan. 22, 2018, now U.S. Pat. No. 11,659,218, issued May 23, 2023, which is hereby incorporated by reference in its entirety.

BACKGROUND

During a content blackout, some users may be restricted from accessing content because of rights restrictions. Conventional approaches rely on inserting blackout cues into a manifest. Inserting and processing these cues is costly and requires integration with many different systems.

SUMMARY

Systems and methods are described for managing blackout restrictions (e.g., or other access restrictions). A user device may restrict access to content based on a blackout condition. The blackout condition may be transmitted to the user device (e.g., along with the content, as metadata with the content, or separately from the content). The blackout condition may be retrieved by the user device from a blackout information server. The blackout information server may be a node of a plurality of nodes having blackout information. Each node may be associated with one or more corresponding content (e.g., content stream, content channel). The user device may retrieve the blackout condition (e.g., periodically, or in response to a request for content) and compare the blackout condition to information associated with the user device, such as location information (e.g., current location), account information (e.g., billing zip code). If the information associated with the user devices satisfies the blackout condition, then the user device may block access to the content. Alternative content may be output instead of the requested content.

A persistent connection, such as a connection based on websockets protocol, may be established between user device and the blackout information server. The status of the connection may be used to restrict access to content. If a connection to a blackout information server (e.g., associated with the content) becomes disconnected, fails authentication, and/or the like, then the user device may block access to the content and/or output alternative content to the user.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Figure 1:
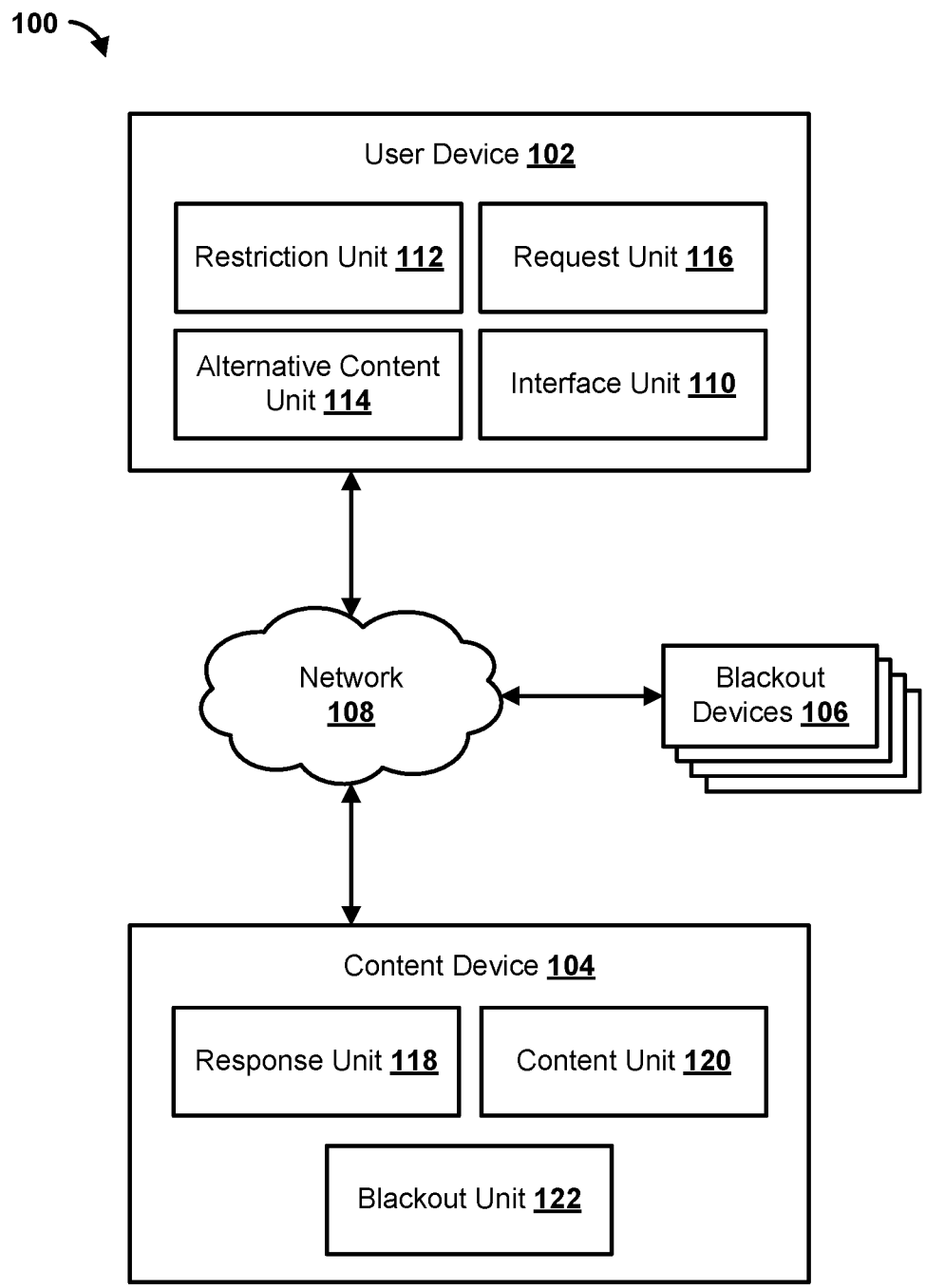
FIG. 1 shows an example system for managing content restrictions.

This disclosure relates generally to implementing content blackouts. The content blackouts may be implemented in packet switched (e.g., internet protocol based) delivery network. A user device (e.g., client), rather than a server or shared network device, may perform blackout identification and management based on blackout information associated with content. The blackout information may be transmitted with the content or may be received from one or more of a plurality of blackout nodes configured to store blackout information. The blackout information may be compared to the user device's provisioned information.

A content blackout may occur if a subset of user devices is prevented from accessing content (e.g., a content stream, the primary content of a content channel) because of rights restrictions. An example blackout occurs if a baseball game is carried on a national cable network, but a local sports network has exclusive rights to the baseball game (e.g., has rights to all games of a particular team in a local market). Due to these exclusive rights, the game on the national cable network must be blacked out for user devices in the local market. In a typical non-packet switched content network (e.g., a cable distribution network, a quadrature amplitude modulation based network) blackouts may be implemented via integrated receiver/decoder (e.g., IRD) switching. For implementing blackout restrictions in a packet switched content network, there have been a number of proposals for managing blackout restrictions, though all of the proposals have shortcomings. The present disclosure includes a new and non-conventional approach to managing blackout restrictions that improves upon these prior proposals.

For example, one conventional approach for managing blackout restrictions involves inserting cues into a manifest associated with content. These cues are then received by the user device, which has custom logic to take action based on the cue. The drawback of this approach is that cue insertion requires integration with transcoders, packagers, as well as components integrated with the transcoders and/or packagers (e.g., iVOD and cDVR recording systems). In contrast, the present disclosure describes an implementation of blackout restrictions that is independent from all content preparation components.

As disclosed herein, one or more user devices may be in communication with one or more blackout nodes configured to receive, store, and/or send blackout information. The blackout nodes may be part of a cluster of blackout nodes. Blackout schedules and other blackout information (e.g., metadata) may be managed by a blackout manager, which may be a separate device from the cluster of blackout nodes. A blackout metadata distributor may communicate with the blackout manager and distribute the blackout information to the cluster of blackout nodes. Specific blackout nodes may be assigned to store blackout information for specific content (e.g., content stream, content channels).

A persistent (e.g., or semi-persistent, or temporary) connection may be established between the user device and a blackout node. The connection may be based on a websocket protocol. A blackout node may receive, store, and/or send blackout information (e.g., metadata, conditions) for a particular channel (e.g., ESPN). The user device may retrieve the blackout information from the blackout node. The user device may check the blackout information against information associated with the user device (e.g., provisioning information, such as subscriber billing zip code). If the information associated with the user device corresponds to (e.g., matches, is within a threshold similarity) the blackout information, the user device may disable video streaming, block access to the content, switch to alternative content, and/or the like. The user device may determine also the status of the connection to the blackout node. If the user device is not authenticated, the connection is not alive, and/or like, the user device may block content, switch to alternative content, and/or the like.

FIG. 1 shows an example system 100 for managing content restrictions. The system 100 may comprise a user device 102, a content device 104, and/or one or more blackout devices 106. The content device 104 may be a server (e.g., content server, video) remotely located from the user device 102. The user device 102 may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like. The user device 102, the content device 104, the one or more blackout devices 106, and/or the like may be in communication via a network 108. The network 108 may comprise a packet-switched network, a non-packet switched network, and/or the like. The network 108 may comprise wireless links and/or wired links. The network 108 may comprise one or more routers, switches, gateways, access points, multiplexers and/or the like.

The user device 102 may comprise an interface unit 110 configured to output (e.g., render via a display of a user device, transmit to a display device) content to a user of the user device. The interface unit 110 may comprise an application, such as a web browser, a mobile application, an application on a media device (e.g., a set top box, a television, a streaming device). The user device 102 may receive a request for content. The request may be received from a user via the application. The request may be received from another device (e.g., remote, second screen device, such as smart phone) in communication with the user device 102. The content may comprise video, audio, text (e.g., a web page, a document), and/or the like. The content may comprise a content stream (e.g., or a content transmission), such as a video stream, a packet switched content stream, and/or the like. The content may be associated with a content channel (e.g., television channel).

The user device 102 may comprise a restriction unit 112 configured to enforce restrictions associated with content. The user device 102 may determine if the requested content is associated with any blackout conditions (e.g., blackout restrictions). A blackout condition may comprise a condition for restricting (e.g., preventing, and/or blocking) access to the content. The blackout condition may comprise a location condition indicating a location (e.g., a region, a state, a country, an area code, a zip code, a time zone) to restrict access to the content. The blackout condition may comprise timing information indicating a start time, an end time, a duration, and/or the like for restricting access to the content. The blackout condition may comprise device information indicating types of devices to restrict access to the content. The blackout condition may comprise user information indicating types of users (e.g., age groups, subscription tiers) to restrict access to the content.

The user device 102 may be configured to determine the blackout condition. The blackout condition can be retrieved from and/or transmitted by at least one of the one or more blackout devices 106. A plurality of available content streams (e.g., content channels) may be associated with (e.g., assigned to) corresponding devices of the one or more blackout devices 106. The one or more blackout devices 106 may store blackout information for the content stream with which the corresponding blackout device is associated. For example, a first blackout device may be assigned to store blackout information associated with a first content stream (e.g., a first content channel, a first content source). A second blackout device may be assigned to store blackout information associated with a second content stream (e.g., a first content channel, a first content source) different from the first content stream.

The user device 102 may be configured to determine the specific blackout device that stores blackout information for requested content. The user device 102 may transmit a message to the specific blackout device requesting blackout information, such as a blackout condition, associated with the requested content. In some implementations, the user device 102 may be configured to establish a connection (e.g., a persistent connection) with one or more of the blackout devices 106, such as the specific blackout device. The connection may be configured to allow the user device 102 and the specific blackout device to transmit data at any time (e.g., if the connection is operational). The connection may comprise a websocket connection. The websocket connection may be based on websocket protocol. The user device 102 may check a status of the connection. If the connection has failed (e.g., timed out), the user device 102 is unauthenticated, is disconnected, and/or the like, the user device 102 may determine to block the user device 102 from accessing the requested content associated with the specific blackout device.

The user device 102 may be configured to determine whether the user device 102 satisfies the blackout condition. The determination of whether the user device 102 satisfies the blackout condition may be made by comparing the blackout condition to provisioning information of the user device 102. The provisioning information may comprise location information associated with one or more of the user device 102 and/or location information associated with an account associated with the user device 102. For example, the provisioning information may comprise a billing zip code associated with the account, a phone number area code associated with the account, a service address associated with the account, and/or the like. The provisioning information may comprise a global positioning system coordinate (e.g., of a mobile device), an internet protocol address (e.g., or portion thereof associated with a location or region), a provisioning device (e.g., directly providing service to the user device 102 and located at a known location), and/or the like. If the user device 102 satisfies the blackout condition, the user device 102 may deny or otherwise block the requested content. If the user device 102 does not satisfy the blackout condition, the user device 102 may access the requested content and output the requested content to the user.

The user device 102 may be configured to determine whether the user device 102 satisfies the blackout condition based on a time of a request for the content. For example, if a user requests the content, then it can be determined whether the user device 102 satisfies the blackout request in response to the request. If the user requests that content be recorded, the user device 102 may be configured to determine whether the user device 102 satisfies the blackout condition based on the time of scheduled recording The user device 102 may comprise an alternative content unit 114 configured to determine alternative content if the user device 102 satisfies a blackout condition associated with requested content. The alternative content may be determined based on a similarity between the requested content and the alternative content. For example, metadata of the requested content may be compared to metadata of the alternative content. The alternative content may be determined based on a source of the requested content. For example, the source of the content may be associated with the alternative content stream. The alternative content may be determined based on a channel number of the alternative stream being close to (e.g., the next up or down) the channel number of the requested content stream. The alternative content may be determined based on the alternative content being default content for use when a blackout condition appears.

The user device 102 may comprise a request unit 116 configured to request content (e.g., or alternative content) from a device, such as the content device 104. The user device 102 may be configured to use various protocols, such as internet protocol, transport control protocol, hypertext transfer protocol, and/or the like. The application may cause the user device 102 to transmit a request for content. The user device 102 may transmit the request to the content device 104.

The content device 104 may comprise a response unit 118 configured to process requests from devices, such as the user device 102. The requests may be requests based on a protocol, such as hypertext transfer protocol. For example, the content device 104 may be configured to process request from an application on the user device 102. The requests may be requests for specific content (e.g., based on a uniform resource locator).

The content device 104 may comprise a content unit 120 configured to access and/or store content. The content may comprise a content stream, content file, content item, content asset, and/or the like. The content may comprise video (e.g., a video stream, a video asset, a video item), audio, an application, text, an image, computer-executable code, and/or the like. The content device 104 may store at least a portion of the content in a data store (e.g., database). In some scenarios, the content may be stored remotely. The content device 104 may be configured to query, access, retrieve, and/or store content in the data store (e.g., whether local or remote). The content may comprise content for an application, such as a mobile application, an application on a media device (e.g., set top box, content streaming device, television), and/or the like.

The content device 104 may comprise a blackout unit 122 configured to manage blackout information. The blackout information may be received from content distributors/owners. The blackout information may be received from a user, such as an administrator. The blackout information may comprise a blackout condition associated with a content stream (e.g., content channels), a content item (e.g., a show, a game, a sportscast, a newscast, an episode, a movie, an event), and/or the like. The blackout information may comprise blackout schedules, blackout metadata, and/or the like for a plurality of content channels (e.g., live content channels, content on demand). The blackout information may indicate content to block, a channel to block the content, a region to block the content, a time to block the content, a combination thereof and/or the like. The content device 104 may transmit the blackout information to the one or more blackout devices 106. For example, the content device 104 may transmit blackout information associated with specific content to one or more corresponding blackout devices associated with the specific content. The one or more corresponding blackout devices may be assigned to store blackout information for only the specific content.

It should be understood that the functionality of the content device 104 may be implemented via a single device or multiple devices (e.g., that may be remotely located from each other). The functionality of the user device 102 may be implemented via multiple devices. For example, a gateway device or other intermediary device may determine blackout information and restrict access to the requested content.

Figure 2:
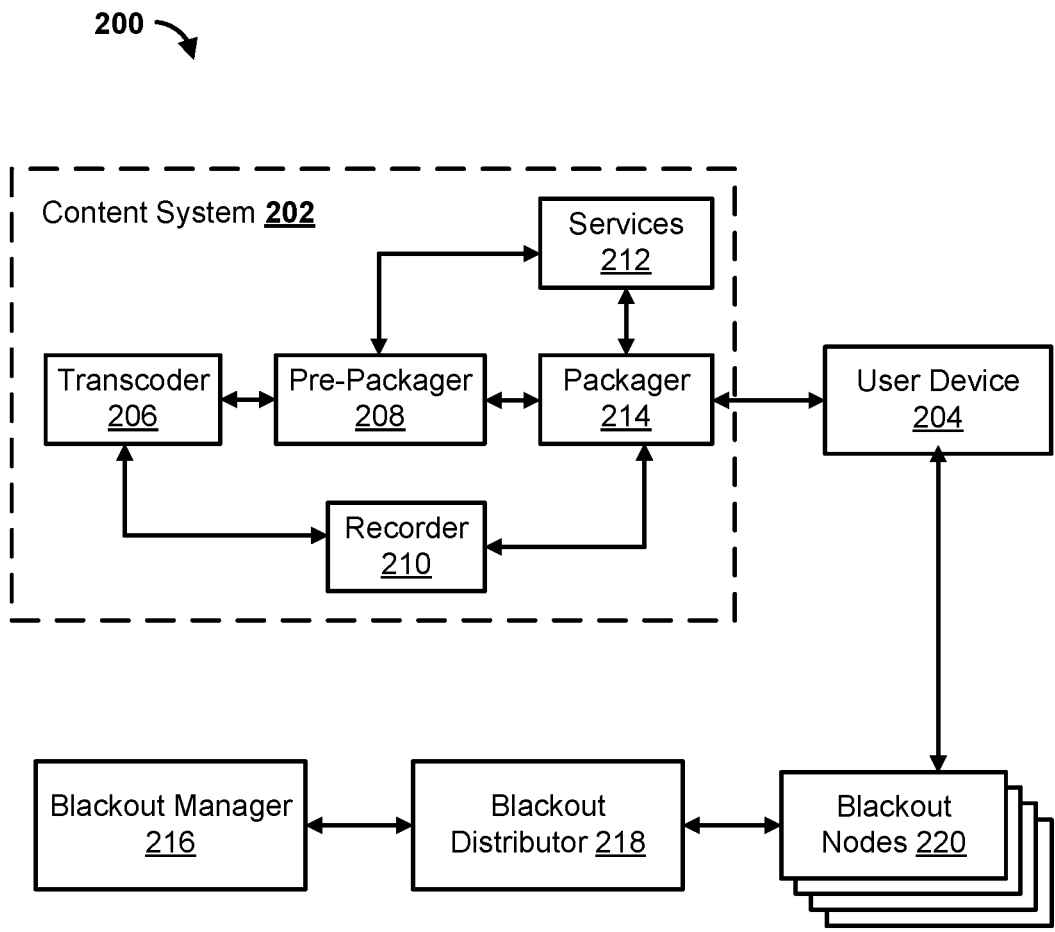
FIG. 2 shows an example system for managing content restrictions.

FIG. 2 shows an example system 200 for managing content restrictions. The system 200 may comprise a content system 202 configured to transmit content to a plurality of user devices, such as user device 204. The content system 202 may be configured to receive, encode, decode, decrypt, encrypt, record, store, and/or the like content from one or more content sources. The content system 202 may be configured to transmit content via a packet-switched protocol, such as internet protocol.

The content system 202 may comprise a transcoder 206 configured to receive and transcode (e.g., encode, decode, encrypt, decrypt, compress, decompress) content from at least one of the one or more content sources. For example, high quality content may be transcoded into multi-bitrate content. A pre-packager 208 may receive the transcoded content from the transcoder 206. The pre-packager 208 may convert the transcoded content into a common format (e.g., MPEG-DASH, or similar). A recorder 210 may record and/or store content (e.g., for processing, for later access by users). Services 212 may receive content and provide a variety of services, such as authentication, device synchronization, cloud distribution, and/or the like. A packager 214 may be configured as a just-in-time-packager configured to package content in response to a request for content from the user device 204. The packager 214 may package the content in a format supported by the user device 204, apply digital rights management, and/or the like. For example, the packager 214 may convert video into proprietary formats, such as Apple HTTP Live Streaming (HLS) and Adobe HTTP Dynamic Streaming (HDS) for video playback on a variety of devices and applications, such as mobile, browser, and internet protocol (IP) set-top devices.

The system 200 may comprise a blackout manager 216 configured to manage blackout information. The blackout manager 216 may be configured to receive blackout schedules, blackout metadata, and/or the like for a plurality of content channels (e.g., live content channels). The blackout information may indicate content to block, a channel to block the content, a region to block the content, a time to block the content, a combination thereof and/or the like.

The system 200 may comprise a blackout distributor 218 configured to distribute the blackout information to a plurality of blackout nodes 220. The blackout information distributor may message (e.g., based on a schedule, based on triggering events) the blackout manager 216 to determine updates in the blackout information. The blackout distributor 218 may determine one or more of the plurality of blackout nodes associated with blackout information. One or more (or each) of the plurality of blackout nodes may be associated with a corresponding content (e.g., content stream, content channel). The blackout distributor 218 may determine which content is associated with blackout information. The blackout distributor 218 may send the blackout information to a particular node of the plurality of blackout nodes 220 that is associated with the content. For example, blackout information may indicate that a baseball game is to be blocked on ESPN in a region of a country. The blackout distributor 218 may determine a node associated with (e.g., dedicated to) storing blackout information for ESPN. The blackout distributor 218 may transmit the blackout information to the determined node of the plurality of blackout nodes 220.

The user device 204 may receive (e.g., in response to a query) blackout information for particular content (e.g., content channel) from a particular blackout node of the plurality of blackout nodes 220. The user device 204 may be configured to compare the blackout information to provisioning information (e.g., subscriber billing zip). If there is a correspondence (e.g., a similarity, a match), the user device 204 may disable video streaming or switch to alternative content. The user device 204 may also determine a status of a connection with the particular blackout node. The user device 204 may be configured to establish a persistent connection (e.g., session) with the one or more of the plurality of blackout nodes 220, such as a particular blackout node associated with content (e.g., or content channel) that a user has requested to access. For example, the plurality of blackout nodes 220 may be configured to support websocket connections with user devices. If the user device 204 determines that the user device 204 is not authenticated and/or the particular blackout node is not responsive (e.g., connection down), the user device 204 may disable video streaming (e.g., for a particular channel) of the requested content.

Figure 3:
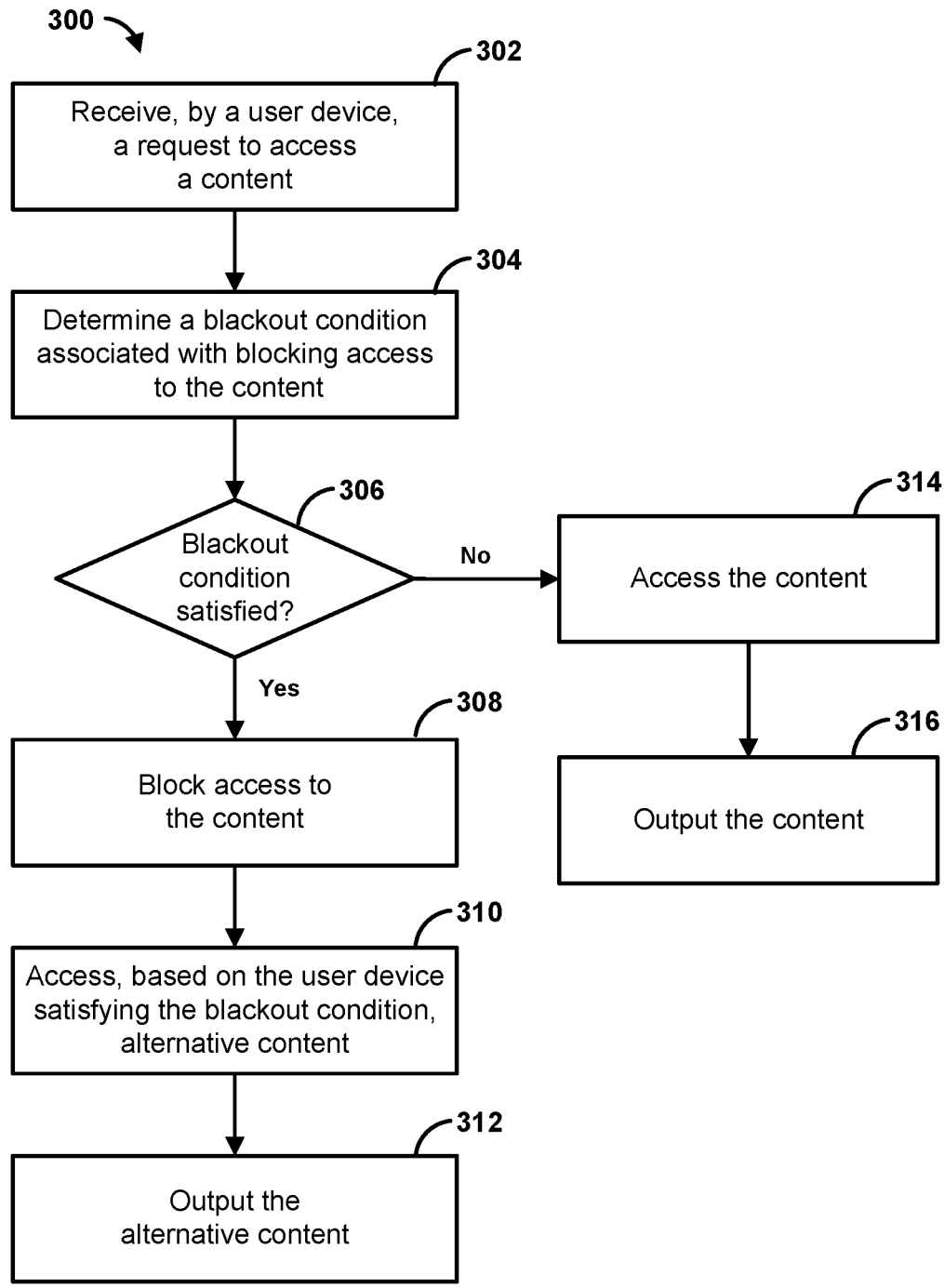
FIG. 3 shows a flow diagram of an example method for restricting content.

FIG. 3 shows a flow diagram of an example method 300 for restricting content. At step 302, a request to access content (e.g., a content stream, a content channel) may be received. The request may be received by a user device (e.g., or by an intermediary device, such as a gateway device). The request may be received from a user of the user device. The user device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 304, a blackout condition (e.g., restriction condition, access condition) associated with blocking access to the content may be determined. The blackout condition may be determined by the user device (e.g., or by the intermediary device). The blackout condition may comprise a condition for restricting (e.g., preventing, and/or blocking) access to the content. The blackout condition may comprise one or more of location information, timing information, user information, device information, and/or the like for blocking the content. The location information may indicate a location (e.g., a region, a state, a country, an area code, a zip code, a time zone) to restrict access to the content. The timing information may indicate a start time, an end time, a duration, and/or the like for restricting access to the content. The device information may indicate types of devices to restrict access to the content. The user information may indicate types of users (e.g., age groups, subscription tiers) to restrict access to the content.

The blackout condition may be received from a blackout information server (e.g., restriction information server, access information server, rights management server) located remotely from the user device. The blackout condition may be determined by querying the blackout information server. The blackout information server may comprise a node of a plurality of nodes configured for storing blackout information (e.g., restriction information, access information, rights management information). The blackout information server may be configured for sending blackout information to a plurality of user devices. One or more (or each) of the plurality of nodes may be associated with different content. For example, each content (e.g., content stream, content source, or content channel) may be associated with a corresponding node. The blackout information server may be configured to receive the blackout condition from a blackout managing device configured to manage the plurality of nodes configured for storing blackout information.

The blackout condition may be determined based on a portion of a transmission of the content. For example, the blackout condition may be transmitted with the content. The blackout condition may be stored in a field (e.g., metadata) of the content. Determining the blackout condition may comprise comparing the blackout condition transmitted with the content to a blackout condition received from the blackout information server. Determining the blackout condition may comprise selecting one of the blackout condition transmitted with the content and the blackout condition received from the blackout information server.

A connection to the blackout information server may be established. Data associated with establishing the connection may be transmitted by the user device. The blackout condition may be received via the connection. A state (e.g., open state) of the connection may not depend on a number of transactions (e.g., request and response), a state of a transaction, and/or a quality of a transaction. For example, the connection may remain in an open state despite packet loss. The connection may remain in an open state until the user device sends an instruction to close the connection (e.g., or until a failure of the connection, such as a failure of an underlying protocol such as transmission control protocol). The connection may be configured to allow the user device and the blackout information server to transmit data at any time (e.g., if the connection is operational). The connection may be configured to remain in an open state after an initial transaction (e.g., a request is received and/or after a response is transmitted to the initial request). The initial transaction may be after the connection is established (e.g., via exchange of an opening handshake). The connection may not have a limit on the number of requests (e.g., transactions, responses). The connection may not automatically be closed after a request is fulfilled. The connection may remain in an open state without requiring an instruction to keep the connection open. The connection may remain in an open state without requiring a request or response to be pending. The connection may be established based on an upgrade handshake from hypertext transfer protocol. The connection may comprise a websocket connection to the blackout information server. The blackout information server may be queried via the connection (e.g., a websocket connection, a websocket session).

The connection may comprise a persistent connection. As a non-limiting example, a persistent connection may be a network communication channel that remains open for additional requests and responses rather than closing after a single exchange. The blackout condition may be received via the persistent connection. A state (e.g., open state) of the persistent connection may not depend on a number of transactions (e.g., request and response), a state of a transaction, and/or a quality of a transaction. For example, the persistent connection may remain in an open state despite packet loss. The persistent connection may remain in an open state until the user device sends an instruction to close the persistent connection (e.g., or until a failure of the persistent connection, such as a failure of an underlying protocol such as transmission control protocol). The persistent connection may be configured to allow the user device and the blackout information server to transmit data at any time (e.g., if the persistent connection is operational). The persistent connection may be configured to remain in an open state after an initial transaction (e.g., a request is received and/or after a response is transmitted to the initial request). The initial transaction may be after the persistent connection is established (e.g., via exchange of an opening handshake). The persistent connection may not have a limit on the number of requests (e.g., transactions, responses). The persistent connection may not automatically be closed after a request is fulfilled. The persistent connection may remain in an open state without requiring an instruction to keep the persistent connection open. The persistent connection may remain in an open state without requiring a request or response to be pending. The persistent connection may be established based on an upgrade handshake from hypertext transfer protocol. The persistent connection may comprise a websocket connection to the blackout information server. The blackout information server may be queried via the persistent connection (e.g., a websocket connection, a websocket session).

At step 306, it may be determined whether the user device satisfies the blackout condition. The determination may be made by the user device (e.g., or by the intermediary device). The determination may be made by comparing the blackout condition to provisioning information of the user device. The provisioning information may comprise location information associated with one or more of the user device or an account associated with the user device. For example, the provisioning information may comprise a billing zip code associated with the account, a phone number area code associated with the account, a service address associated with the account, and/or the like. The provisioning information may comprise a global positioning system coordinate (e.g., of a mobile device), an internet protocol address (e.g., or portion thereof associated with a location or region), a provisioning device (e.g., directly providing service to the user device and located at a known location), and/or the like.

If the user device satisfies the blackout condition, step 308 may be performed. If the user device does not satisfy the blackout condition, step 314 may be performed.

At step 308, access to the content may be blocked. The user device (e.g., or the intermediary device) may block the user from viewing the content. The user device may deny a request to access the content. If a user has tuned to the content (e.g., a content channel), a blank screen may be displayed, an error message may be displayed, an encrypted version of the content may be displayed such that the user is not able to discern the content.

At step 310, the alternative content may be accessed. The alternative content may be accessed by the user device (e.g., or by the intermediary device). The alternative content may be accessed based on the user device satisfying the blackout condition. The user device may access the alternative content via another channel, a remote location, an in-band channel dedicated to alternative content, and/or the like. The alternative content may be accessed via a packet switched protocol, such as internet protocol. The alternative content may be accessed via a non-packet switched protocol, such as a quadrature amplitude modulation based protocol.

At step 312, the alternative content may be output. The alternative content may be output by the user device (e.g., or by the intermediary device). The alternative content may be output based on (e.g., in response to) the request to access the content. The alternative content may be output temporarily while the blackout condition is satisfied. The alternative content may be output via the content channel. The alternative content may be output via user devices in one geographic region while the content is output via user devices in a different geographic region. The alternative content may be output based on causing the user device to tune (e.g., or stream) to a different content channel and/or content source.

At step 314, the content may be accessed. The content may be accessed by the user device (e.g., or by the intermediary device). The content may be accessed based on the user device not satisfying the blackout condition. The content may be accessed via a content channel, a content source, and/or the like. The user device may tune to the content, decode the content, and/or the like. The content may be accessed via a packet switched protocol, such as internet protocol. The content may be accessed via a non-packet switched protocol, such as a quadrature amplitude modulation based protocol.

At step 316, the content may be output. The content may be output by the user device (e.g., or by the intermediary device). The content may be output based on (e.g., in response to) the request to access the content. The content may be output based on (e.g., in response to) the user device not satisfying the blackout condition. The content may be output via a display (e.g., a screen, a television).

As an illustration, the user device may receive data instructing the user device to access a sports event on a cable sports channel. The user device may check metadata (e.g., inserted in the content or from an electronic program guide) associated with the sports event. The user device may determine that the metadata does not comprise blackout information. The user device may use a list or database to determine a blackout node assigned to store blackout information associated with the cable sports channel. The user device may query, via a persistent connection (e.g., such as a websockets based connection) the blackout node for the blackout information associated with the cable sports channel. The query may specify the sports event or may be generic to the channel. The blackout node may send blackout information that indicates that the sports event is blocked in a region. The region may be a region where a sports team in the sports event has a home base. The user device may compare the region in the blackout region to a billing zip code associated with a user account. The user device may determine that the billing zip code is within or otherwise matches the blocked region. The user device may direct the user to access the sports event on a local channel or may output a different sports event. If the user is attempting to schedule a recording of the sports event, the user device may output an error message indicating that the recording cannot be scheduled.

Figure 4:
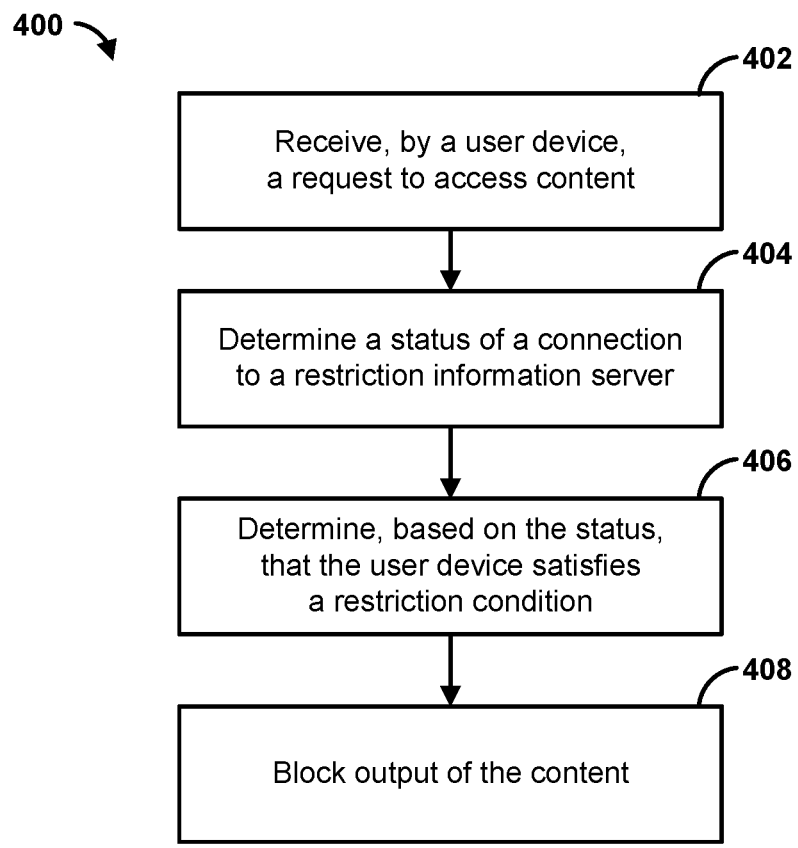
FIG. 4 shows a flow diagram of an example method for restricting content.

FIG. 4 shows a flow diagram of an example method 400 for restricting content. At step 402, a request to access content (e.g., a content stream, a content channel, a content file) may be received. The request may be received by a user device (e.g., or by an intermediary device, such as a gateway device). The request may be received from a user of the user device. The user device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like. A restriction information server may be determined. The restriction information server may be configured to restore restriction information associated with the content. A connection may be established with restriction information server. For example, the user device may send data associated with establishing a connection with the restriction information server. The connection may comprise a persistent connection as described herein.

The connection may be a connection to the restriction information server. The restriction information server may be configured to store restriction information associated with the content. A state (e.g., open state) of the connection may not depend on a number of transactions (e.g., request and response), a state of a transaction, and/or a quality of a transaction. For example, the connection may remain in an open state despite packet loss. The connection may remain in an open state until the user device sends an instruction to close the connection (e.g., or until a failure of the connection, such as a failure of an underlying protocol such as transmission control protocol). The connection may be configured to allow the user device and the restriction information server to transmit data at any time (e.g., if the connection is operational). The connection may be configured to remain in an open state after an initial request is received and/or after a response is transmitted to the initial request. The connection may not have a limit on the number of requests. The connection may not automatically be closed after a request is fulfilled. The connection may remain in an open state without requiring an instruction to keep the connection open. The connection may remain in an open state without requiring a request or response to be pending. The connection may be established based on an upgrade handshake from hypertext transfer protocol. The connection may comprise a websocket connection (e.g., a connection based on websocket protocol, a websocket session) to the restriction information server.

The connection may comprise a persistent connection. As a non-limiting example, a persistent connection may be a network communication channel that remains open for additional requests and responses rather than closing after a single exchange. The restriction condition may be received via the persistent connection. A state (e.g., open state) of the persistent connection may not depend on a number of transactions (e.g., request and response), a state of a transaction, and/or a quality of a transaction. For example, the persistent connection may remain in an open state despite packet loss. The persistent connection may remain in an open state until the user device sends an instruction to close the persistent connection (e.g., or until a failure of the persistent connection, such as a failure of an underlying protocol such as transmission control protocol). The persistent connection may be configured to allow the user device and the restriction information server to transmit data at any time (e.g., if the persistent connection is operational). The persistent connection may be configured to remain in an open state after an initial transaction (e.g., a request is received and/or after a response is transmitted to the initial request). The initial transaction may be after the persistent connection is established (e.g., via exchange of an opening handshake). The persistent connection may not have a limit on the number of requests (e.g., transactions, responses). The persistent connection may not automatically be closed after a request is fulfilled. The persistent connection may remain in an open state without requiring an instruction to keep the persistent connection open. The persistent connection may remain in an open state without requiring a request or response to be pending. The persistent connection may be established based on an upgrade handshake from hypertext transfer protocol. The persistent connection may comprise a websocket connection to the restriction information server. The restriction information server may be queried via the persistent connection (e.g., a websocket connection, a websocket session).

The restriction information server may be a node of a plurality of nodes configured for storing restriction information. One or more (or each) of the plurality of nodes may be associated with different content. The restriction information server may be configured for sending restriction information to a plurality of user devices. The restriction information server may be configured to receive the restriction condition from a restriction managing device configured to manage the plurality of nodes.

At step 404, a status of a connection may be determined. The status of connection may be determined by the user device (e.g., or by the intermediary device). Determining the status of the connection may comprise determining that the connection is one or more of unauthenticated, authenticated, connected, disconnected, a combination thereof, and/or the like. The status may be determined by accessing a transaction history associated with the connection. For example, if the transaction history comprises a message having an open frame (e.g., data indicating the connection is opened) and does not comprise a message having a close frame (e.g., data indicating the connection is closed), then the status may be determined to be connected. If the transaction history comprises a message having a close frame (e.g., data indicating the connection is closed), then the status can be determined to be disconnected. As an example, it can be determined if an opening handshake and/or a closing handshake is initiated and/or completed. The status may be determined by accessing a field of a message, such as a most recent message, received and/or transmitted via the connection. The status may be determined by transmitting a new message to the restriction information server. If a response is not received, it may be determined that the connection is disconnected. The status may be determined by accessing one or more state variables associated with the connection. A value of offline, closed, closing, timed out, or other similar value indicates that the connection is offline. A value of open, operational, and/or similar may indicated that the connection is online.

At step 406, it may be determined whether a restriction condition is satisfied. The determination may be made by the user device (e.g., or by the intermediary device). It may be determined that the user device satisfies the restriction condition. The determination may be made based on the status of the connection to the restriction information server. If the connection is disconnected, offline, unauthenticated, and/or the like it can be determined that the restriction condition is satisfied. If the connection is operational, authenticated, and/or the like, it can be determined that the restriction condition is not satisfied.

The determination that the user device satisfies the restriction condition may be based on comparing the restriction condition to provisioning information of the user device. If the status of the connection indicates that the restriction information server is offline, unauthenticated, and/or the like, the restriction condition may be a previously received (e.g., received during a prior viewing session, according to schedule) restriction condition, a default restriction condition, and/or the like. The provisioning information may comprise location information associated with one or more of the user device or an account associated with the user device. For example, the provisioning information may comprise a billing zip code associated with the account, a phone number area code associated with the account, a service address associated with the account, and/or the like. The provisioning information may comprise a global positioning system coordinate (e.g., of a mobile device), an internet protocol address (e.g., or portion thereof associated with a location or region), a provisioning device (e.g., directly providing service to the user device and located at a known location), and/or the like.

At step 408, output of the content may be blocked. The output may be blocked based on (e.g., in response to) the request to access the content. The output may be blocked based on the determination that the user satisfies the restriction condition. The output of the content may be blocked by the user device (e.g., or by the intermediary device). The user device may not request, not decode, and/or not display the content. Alternative content may be output to the user instead of the content. An error message may be output instead of the content.

As an illustration, the user device may receive data instructing the user device to access a sports event on a cable sports channel. The user device may use a list or database to determine a restriction node assigned to store restriction information associated with the cable sports channel. The user device may determine the status of a connection with the restriction node. The status may be determined by accessing a state variable associated with the connection. The state variable may have a value of offline, closed, closing, or other similar variable. The user device may determine that the connection is offline based on the state variable. The user device may determine that the restriction condition applies because the connection is offline. The user device may block or deny access to the cable sports event on the cable sports channel. The user device may direct the user to access the sports event on a local channel or may output a different sports event.

Figure 5:
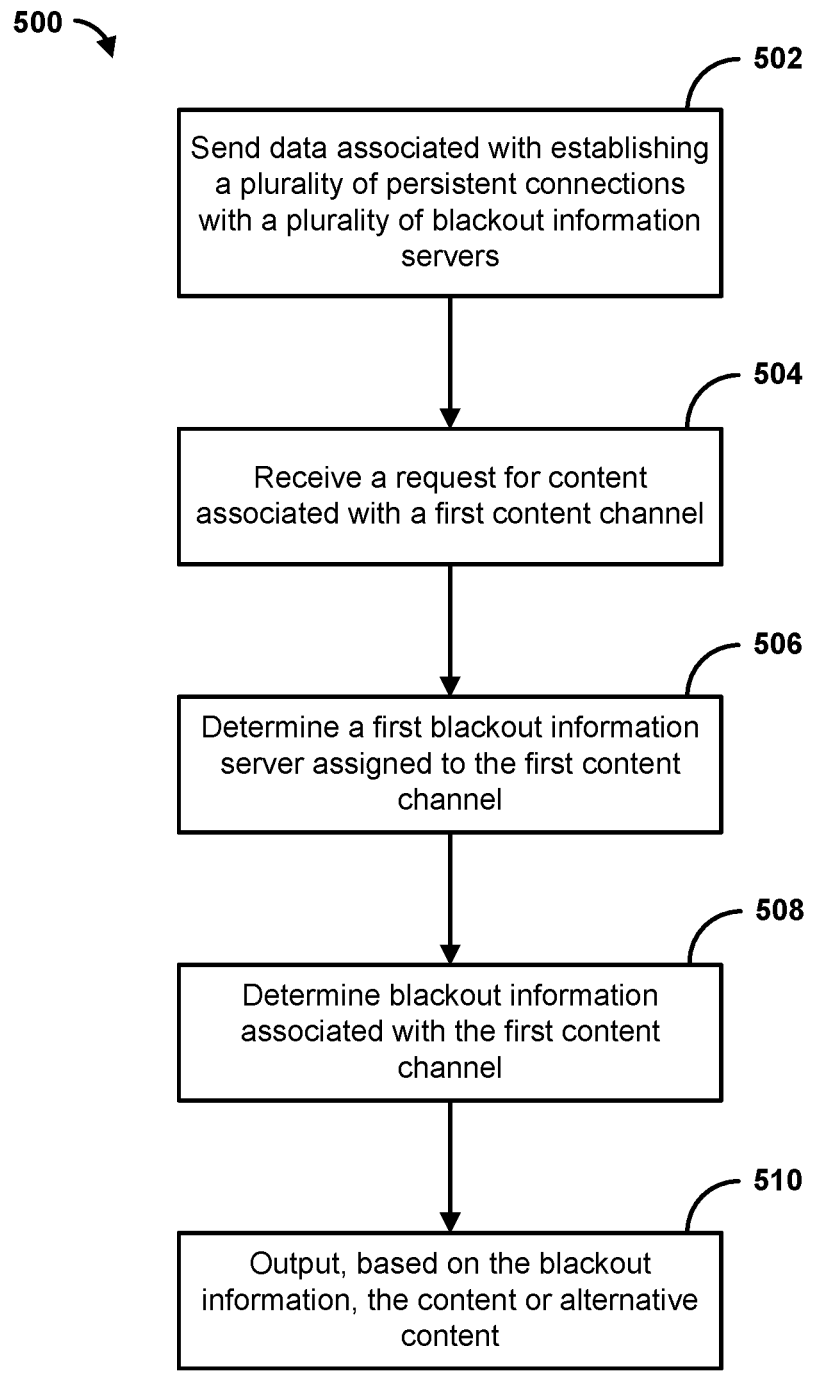
FIG. 5 shows a flow diagram of an example method for restricting content.

FIG. 5 shows a flow diagram of an example method 500 for restricting content. At step 502, data associated with establishing a plurality of connections with a plurality of blackout information servers (e.g., or restriction information servers, information servers, access information servers, rights management servers) may be transmitted. The data may be transmitted by a user device (e.g., or by an intermediary device such as a gateway device). The user device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

Each of the plurality of blackout information servers may be assigned to a different set of content channels. One or more (or each) of the plurality of blackout information servers may have an additional plurality of persistent connections with a plurality of user devices. The assignments may be made by a blackout managing device (e.g., restriction managing device, access managing device, managing device, rights management device) configured to manage the plurality of blackout information servers. As an illustration, each channel of a content network may be assigned a different blackout information server. For X number of content channels, there may be X number of blackout information servers. As an example, one or more of the blackout information servers may be assigned to multiple content channels. For example, 10 blackout information servers may each be assigned 10 content channels from a total of 100 channels.

A state (e.g., open state) of the plurality of connections may not depend on a number of transactions (e.g., request and response), a state of a transaction, and/or a quality of a transaction. For example, the plurality of connections may remain in an open state despite packet loss. The plurality of connections may remain in an open state until the user device sends an instruction to close a connection (e.g., or until a failure of the connection, such as a failure of an underlying protocol such as transmission control protocol). The plurality of connections may be configured to allow transmission of data at any time (e.g., if the connection is operational). The plurality of connections may be configured to remain in an open state after an initial request is received and/or after a response is transmitted to the initial request. The plurality of connections may not have a limit on the number of requests. The plurality of connection may not automatically be closed after a request is fulfilled. The plurality of connections may remain in an open state without requiring an instruction to keep the corresponding connection open. The plurality of connections may remain in an open state without requiring a request or response to be pending. The plurality of connections may be established based on an upgrade handshake from hypertext transfer protocol. The plurality of connections may comprise connections based on websocket protocol.

The plurality of connections may comprise persistent connections. As a non-limiting example, a persistent connection may be a network communication channel that remains open for additional requests and responses rather than closing after a single exchange. The blackout condition (e.g., restriction condition, access condition) may be received via a persistent connection. A state (e.g., open state) of the persistent connections may not depend on a number of transactions (e.g., request and response), a state of a transaction, and/or a quality of a transaction. For example, the persistent connections may remain in an open state despite packet loss. The persistent connections may remain in an open state until the user device sends an instruction to close the persistent connections (e.g., or until a failure of the persistent connections, such as a failure of an underlying protocol such as transmission control protocol). The persistent connections may be configured to allow the user device and the blackout information server to transmit data at any time (e.g., if the persistent connection is operational). The persistent connections may be configured to remain in an open state after an initial transaction (e.g., a request is received and/or after a response is transmitted to the initial request). The initial transaction may be after the persistent connections are established (e.g., via exchange of an opening handshake). The persistent connections may not have a limit on the number of requests (e.g., transactions, responses). The persistent connections may not automatically be closed after a request is fulfilled. The persistent connections may remain in an open state without requiring an instruction to keep the persistent connections open. The persistent connections may remain in an open state without requiring a request or response to be pending. The persistent connections may be established based on an upgrade handshake from hypertext transfer protocol. The persistent connections may comprise a websocket connection to the blackout information server. The blackout information server may be queried via the persistent connections (e.g., a websocket connection, a websocket session).

At step 504, a request for content associated with a first content channel may be received. The request may be received by the user device (e.g., or by the intermediary device). The request may be received from a user of the user device. The request may comprise a request to access a content channel (e.g., or content source). The content channel may comprise the content (e.g., within a live content stream)

At step 506, a first blackout information server of the plurality of blackout information servers that is assigned to the first content channel may be determined. The first blackout information server may be determined by the user device (e.g., or by the intermediary device). The first blackout information server may be determined based on an association of the first blackout information server with the content (e.g., or a content channel, content source). As an example, the user device may comprise a list of the plurality of blackout information servers. The list may associate the plurality of blackout information servers with the corresponding content and/or content channel. As an example, the plurality of blackout information servers may be identified in metadata associated with corresponding content channels. An electronic program guide may be queried to determine which blackout information server is associated with a channel and/or content requested by a user.

At step 508, blackout information (e.g., restriction information, access information) associated with the first content channel may be determined. The blackout information may be determined based on a first persistent connection of the plurality of persistent connections that is associated with the first blackout information server. The first blackout information server may be configured to keep open the first persistent connection after a response to an initial request is transmitted via the first persistent connection. The first blackout information server may be configured to keep open the first persistent connection without receiving an instruction to keep first the persistent connection open.

Determining blackout information associated with the first content channel may comprise determining that a blackout condition is associated with the content (e.g., or content channel. The blackout information may comprise the blackout condition. The blackout condition may comprise a condition for restricting (e.g., preventing, and/or blocking) access to the content. The blackout condition may comprise one or more of location information, timing information, user information, device information, and/or the like for blocking the content. The location information may indicate a location (e.g., a region, a state, a country, an area code, a zip code, a time zone) to restrict access to the content. The timing information may indicate a start time, an end time, a duration, and/or the like for restricting access to the content. The device information may indicate types of devices to restrict access to the content. The user information may indicate types of users (e.g., age groups, subscription tiers) to restrict access to the content.

A determination may be made that the user device (e.g., or request for content) satisfies the blackout condition. The determination may be made by comparing the blackout condition to provisioning information of the user device. The provisioning information may comprise location information associated with one or more of the user device or an account associated with the user device. For example, the provisioning information may comprise a billing zip code associated with the account, a phone number area code associated with the account, a service address associated with the account, and/or the like. The provisioning information may comprise a global positioning system coordinate (e.g., of a mobile device), an internet protocol address (e.g., or portion thereof associated with a location or region), a provisioning device (e.g., directly providing service to the user device and located at a known location), and/or the like.

Determining blackout information associated with the first content channel may comprise determining that there are no blackout conditions associated with the content (e.g., or the content channel). For example, the blackout information may not comprise a blackout condition associated with the content.

The content or alternative content may be accessed. The content or alternative content may be accessed by the user device (e.g., or by the intermediary device). The content may be accessed based on the user device not satisfying the blackout condition or the blackout information not having the blackout condition. The alternative content may be accessed based on the user device satisfying the blackout condition. The content or alternative content may be accessed via a content channel, a content source, and/or the like. The user device may tune to the content or alternative content, decode the content or alternative content, and/or the like. The content or alternative content may be accessed via a packet switched protocol, such as internet protocol. The content or alternative content may be accessed via a non-packet switched protocol, such as a quadrature amplitude modulation based protocol.

At step 510, the content or alternative content may be output. The content or the alternative content may be output by the user device (e.g., or by the intermediary device). The content or alternative content may be output based on (e.g., in response to) the request for content. The content or alternative content may be output based on the determination of whether the request satisfies the blackout information. The content or alternative content may be output based on the blackout information. If a blackout condition is determined and the user device satisfies the blackout condition, alternative content may output instead of the content. If no blackout condition is determined or no the user device does not satisfy the blackout condition, the content may be output. The content or the alternative content may be output via a display (e.g., a screen, a television).

Figure 6:
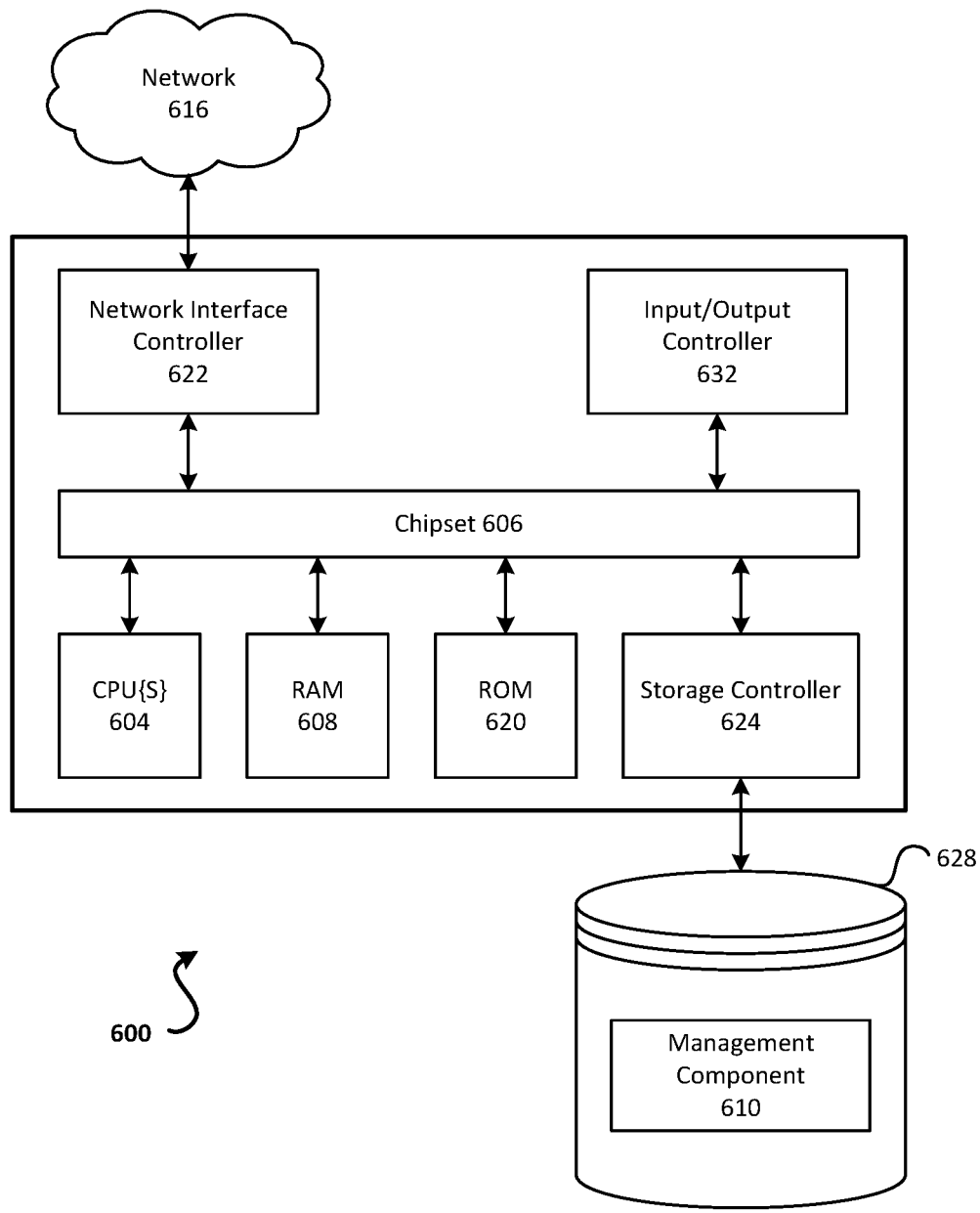
FIG. 6 shows an example computing system.

FIG. 6 shows an example computer architecture for a computing system 600 capable of executing software for performing operations as described above in connection with FIGS. 1-5. It will be appreciated that the described processes may be performed by any suitable system components including, for example, by discrete computing systems that communicate over a communications link. The computer architecture shown in FIG. 6 illustrates a conventional server computer, workstation, desktop computer, laptop, tablet, network appliance, PDA, e-reader, digital cellular phone, or other computing node, and may be utilized to execute any aspects of the software components presented herein.

The computer 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. CPUs 604 may be standard programmable processors that perform arithmetic and logical operations necessary for the operation of computer 600.

The CPUs 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 606 may provide an interface between the CPUs 604 and the remainder of the components and devices on the baseboard. The chipset 606 may provide an interface to a random access memory (RAM) 608 used as the main memory in the computer 600. The chipset 606 may provide an interface to a computer-readable storage medium, such as a read-only memory (ROM) 620 or non-volatile RAM (NVRAM) (not shown), for storing basic routines that may help to start up the computer 600 and to transfer information between the various components and devices. The ROM 620 or NVRAM may also store other software components necessary for the operation of the computer 600 in accordance with the embodiments described herein.

The computer 600 may operate in a networked environment using logical connections to remote computing nodes and computer systems through a LAN 616. The chipset 606 may include functionality for providing network connectivity through a network interface controller (NIC) 622, such as a gigabit Ethernet adapter. The NIC 622 may be capable of connecting the computer 600 to other computing nodes over the LAN 616. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in greater detail herein. The mass storage device 628 may be connected to the computer 600 through a storage controller 624 connected to the chipset 606. The mass storage device 628 may comprise of one or more physical storage units. The storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 628 is characterized as primary or secondary storage and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may read information from the mass storage device 628 by detecting the physical states or characteristics of one or more particular locations within the physical storage units.

The computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 600.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 628 may store an operating system utilized to control the operation of the computer 600. According to one embodiment, the operating system comprises a version of the LINUX operating system. According to another embodiment, the operating system comprises a version of the WINDOWS SERVER operating system from the MICROSOFT Corporation. According to another embodiment, the operating system may comprise a version of the UNIX operating system. It should be appreciated that other operating systems may also be utilized. The mass storage device 628 may store other system or application programs and data utilized by the computer 600, such as the management component 610 and/or the other software components described above. The management component may be configured to implement the methods and systems described herein.

The mass storage device 628 or other computer-readable storage media may also be encoded with computer-executable instructions, which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. The computer 600 may have access to computer-readable storage media storing computer-executable instructions, which, when executed by the computer 600, may perform operating procedures described above in connection with FIGS. 2-5.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Accordingly, systems and methods have been described that provide device pairing and authentication. The described systems and methods allow for devices to confirm that communications are being performed with, and processing provided by, an intended device. It will be appreciated that while example embodiments have been described in the context of devices that perform sensitive or secure processing, the intended embodiments extend to devices or components that perform processing for any suitable purpose.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present methods and systems may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; various omissions, substitutions, and changes in the form of the methods and systems described herein may be made without departing from the spirit of the inventions disclosed herein.

The accompanying claims and their equivalents are intended to cover such forms or modifications as would fall within the scope and spirit of certain of the inventions disclosed herein.

The invention claimed is:

1. A method comprising:
   receiving, by a user device, a request to access content;
   determining, by the user device, and based on data stored on the user device associating each of a plurality of content with a corresponding blackout information server of a plurality of blackout information servers, that a blackout information server is associated with the content;
   receiving, by the user device and from the blackout information server, a blackout condition associated with the content;
   determining, by the user device, that the user device satisfies the blackout condition associated with the content; and
   outputting alternative content based on the user device satisfying the blackout condition.

2. The method of claim 1, wherein the blackout information server is configured for sending blackout information to a plurality of user devices.

3. The method of claim 1, further comprising sending, by the user device, data associated with establishing a persistent connection with the blackout information server, of the plurality of blackout information servers, wherein the persistent connection comprises a websocket connection to the blackout information server.

4. The method of claim 1, wherein the blackout information server is configured to receive the blackout condition from a blackout managing device configured to manage the plurality of blackout information servers.

5. The method of claim 1, wherein determining that the user device satisfies the blackout condition is based on comparing the blackout condition to location information associated with one or more of the user device or an account associated with the user device.

6. The method of claim 1, wherein the blackout condition comprises device information for blocking the content, wherein the device information is associated with a type of device associated with the user device.

7. The method of claim 1, wherein the determining that the blackout information server is associated with the content comprises determining an association between the blackout information server and a content channel associated with the content.

8. A method comprising:
   receiving, by a user device, a request for content associated with a first content channel of a plurality of content channels;
   determining, by the user device, and based on data stored on the user device associating each of the plurality of content channels with a corresponding blackout information server of a plurality of blackout information servers, a first blackout information server of the plurality of blackout information servers that is assigned to the first content channel;
   determining, by the user device, blackout information associated with the first content channel; and
   outputting, based on whether the request satisfies the blackout information, the content or alternative content.

9. The method of claim 8, wherein each blackout information server of the plurality of blackout information servers has a persistent connection with a plurality of user devices.

10. The method of claim 8, wherein determining the blackout information associated with the first content channel comprises determining that there are no blackout conditions associated with the content.

11. The method of claim 8, wherein determining the blackout information associated with the first content channel comprises determining that a blackout condition is associated with the content.

12. The method of claim 11, further comprising determining that the user device receiving the request for content satisfies the blackout condition, wherein the alternative content is output instead of the content.

13. The method of claim 8, wherein the first blackout information server is configured to keep open a first persistent connection of a plurality of persistent connections between the user device and the plurality of blackout information servers after a response to an initial request is sent via the first persistent connection.

14. The method of claim 8, wherein the first blackout information server is configured to keep open a first persistent connection of a plurality of persistent connections between the user device and the plurality of blackout information servers without receiving an instruction to keep first the persistent connection open.

15. The method of claim 8, wherein the data stored on the user device is based on metadata received one or more of in the content or in electronic program data.

16. A method comprising:
    receiving, by a user device, a request to access a content;
    determining, by the user device, and based on data stored on the user device associating each of a plurality of content with a corresponding restriction information server of a plurality of restriction information servers, a restriction information server, of the plurality of restriction information servers, configured to store restriction information associated with the content; and
    blocking, based on the user device satisfying a restriction condition received from the restriction information server, output of the content.

17. The method of claim 16, wherein the restriction information server is configured for sending restriction information to a plurality of user devices.

18. The method of claim 16, further comprising establishing a persistent connection between the user device and the restriction information server, wherein the persistent connection between the user device and the restriction information server comprises a websocket connection to the restriction information server.

19. The method of claim 16, wherein the restriction information server is configured to receive the restriction condition from a restriction managing device configured to manage the plurality of restriction information servers.

20. The method of claim 16, wherein a status of a persistent connection between the user device and the restriction information server is one or more of unauthenticated or disconnected.

21. The method of claim 16, wherein the determining the restriction information server configured to store restriction information associated with the content comprises determining an association between the restriction information server and a content channel associated with the content.

* * * * *